US012646387B2

(12) United States Patent
Fong

(10) Patent No.: US 12,646,387 B2
(45) Date of Patent: Jun. 2, 2026

(54) GAMING SYSTEM WITH SPLITTABLE SYMBOL POSITIONS

(71) Applicant: Aristocrat Technologies Australia Pty Limited, North Ryde (AU)

(72) Inventor: Colin Fong, Penshurst (AU)

(73) Assignee: Aristocrat Technologies Australia Pty Limited, North Ryde (AU)

(*) Notice: Subject to any disclaimer, the term of this patent is extended or adjusted under 35 U.S.C. 154(b) by 0 days.

(21) Appl. No.: 16/784,519

(22) Filed: Feb. 7, 2020

(65) Prior Publication Data

US 2020/0302754 A1 Sep. 24, 2020

(30) Foreign Application Priority Data

Mar. 20, 2019 (AU) ................................ 2019900937
Sep. 20, 2019 (AU) ................................ 2019232947

(51) Int. Cl.
*G07F 17/32* (2006.01)
*G07F 17/34* (2006.01)

(52) U.S. Cl.
CPC .......... *G07F 17/34* (2013.01); *G07F 17/3213* (2013.01); *G07F 17/3251* (2013.01); *G07F 17/3262* (2013.01)

(58) Field of Classification Search
CPC .. G07F 17/34; G07F 17/3213; G07F 17/3251; G07F 17/3262
USPC ........................................................... 463/20
See application file for complete search history.

(56) References Cited

U.S. PATENT DOCUMENTS

| | | | | |
|---|---|---|---|---|
| 8,333,649 | B2 | 12/2012 | Marks et al. | |
| 9,607,467 | B2 | 3/2017 | Wotton et al. | |
| 2008/0182650 | A1* | 7/2008 | Randall | G07F 17/34 463/25 |
| 2010/0029381 | A1* | 2/2010 | Vancura | G07F 17/3244 463/30 |
| 2014/0080571 | A1* | 3/2014 | Garretsen | G07F 17/3218 463/20 |
| 2015/0364001 | A1 | 12/2015 | Wotton et al. | |
| 2016/0093141 | A1* | 3/2016 | Nelson | G07F 17/326 463/20 |

OTHER PUBLICATIONS

Hold Your Horses (https://www.youtube.com/watch?v=GkjUz-H-LP4), Youtube date Aug. 12, 2016, Novomatic.
Australian Examination Report No. 1 issued in App. No. AU2019232947, dated Dec. 23, 2024, 3 pages.

* cited by examiner

*Primary Examiner* — Ryan Hsu
(74) *Attorney, Agent, or Firm* — Blank Rome LLP

(57) ABSTRACT

A gaming system comprises a display, a player interface, and a game controller having a processor, and a memory storing symbol data, a pay table, and instructions, when executed, cause the processor to receive a selection specifying paylines for evaluation, each payline specifying one symbol position on one column, split a first symbol position into sub-positions, randomly select symbols for display at the symbol positions and sub-positions, display the symbols selected, and evaluate the symbols displayed at the sub-positions on each payline that includes the sub-positions, whether the symbols displayed at the sub-positions contribute to a winning combination.

16 Claims, 13 Drawing Sheets

300

| | Reel position | Reel 1 (321) | Reel 2 (322) | Reel 3 (323) | Reel 4 (324) | Reel 5 (325) |
|---|---|---|---|---|---|---|
| 301 | 1 | Pic 1 | 10 | Pic 3 | Q | Pic 1 |
| 302 | 2 | Wild | Q | K | A | 10 |
| 303 | 3 | J | K | 10 | 10 | A |
| 304 | 4 | Q | A | Q | Pic 2 | Pic 2 |
| 305 | 5 | 10 | Pic 2 | K | J | A |
| 306 | 6 | A | 9 | Pic 1 | Wild | Q |
| 307 | 7 | Pic 2 | Wild | J | 9 | K |
| 308 | 8 | A | Pic 3 | K | 10 | Pic 2 |
| 309 | 9 | Q | Q | 9 | A | 9 |
| 310 | 10 | K | 10 | Q | Q | Wild |
| 311 | 11 | J | A | 10 | J | 9 |
| 312 | 12 | 10 | Wild | Wild | K | Q |
| 313 | 13 | Pic 3 | K | A | Wild | 10 |
| 314 | 14 | Wild | J | A | Pic 3 | Wild |
| 315 | 15 | 9 | 10 | Wild | Pic 1 | A |

331 343 342 341

FIG. 3

GAMING SYSTEM WITH SPLITTABLE SYMBOL POSITIONS

RELATED APPLICATION(S)

The present application claims priority to Australian Patent Application No. 2019900937, filed Mar. 20, 2019, and Australian Patent Application No. 2019232947, filed Sep. 20, 2019. Both applications are hereby incorporated by reference in their entirety.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

Embodiments of the disclosure provide split symbol positions that enable larger winning combinations or winning combinations to be formed within a number of columns of symbol positions.

In an embodiment a gaming device comprises a display, a processor, and a memory storing (a) symbol data, (b) a pay table, and (c) instructions. When the instructions are executed by the processor, they cause the processor to receive a player selection for play of a game, wherein the player selection specifies paylines to be used in an evaluation, select symbols for a set of symbol positions, the set of symbol positions comprising a plurality of columns of symbol positions, wherein each payline is formed from a symbol position of each column, wherein at least one symbol position is split into a set of sub-positions comprising at least two columns of sub-positions, and symbols are selected from the symbol data for each of the sub-positions, display the selected symbols on the display at respective symbol positions and sub-positions, and evaluate the displayed symbols based on the symbol positions on specified paylines and the pay table, wherein, for each split symbol position and each specified payline that includes the respective split symbol position, the processor evaluates whether a symbol from each column of sub-positions contributes to a winning combination, whereby winning combinations can include more symbols than symbol positions.

Another embodiment provides a method of operating a gaming device comprising a display, and a memory storing (a) symbol data, and (b) a pay table. The method comprises receiving a player selection for play of a game, wherein the player selection specifies paylines to be used in an evaluation, selecting symbols for a set of symbol positions, the set of symbol positions comprising a plurality of columns of symbol positions, wherein each payline is formed from a symbol position of each column, wherein at least one symbol position is split into a set of sub-positions comprising at least two columns of sub-positions, and symbols are selected from the symbol data for each of the sub-positions, displaying the selected symbols on the display at respective symbol positions and sub-positions, and evaluating the displayed symbols based on the symbol positions on specified paylines and the pay table, wherein, for each split symbol position and each specified payline that includes the respective split symbol position, the processor evaluates whether a symbol from each column of sub-positions contributes to a winning combination, whereby winning combinations can include more symbols than symbol positions.

Another embodiment provides a gaming system comprising: a display; one or more processors; and at least one memory storing (a) symbol data, (b) a pay table, and (c) instructions which when executed by the one or more processors, cause the one or more processors to: receive a player selection for play of a game, wherein the player selection specifies paylines to be used in an evaluation; select symbols for a set of symbol positions, the set of symbol positions comprising a plurality of columns of symbol positions, wherein each payline is formed from a symbol position of each column, wherein at least one symbol position is split into a set of sub-positions comprising at least two columns of sub-positions, and symbols are selected from the symbol data for each of the sub-positions; display the selected symbols on the display at respective symbol positions and sub-positions; and evaluate the displayed symbols based on the symbol positions on specified paylines and the pay table, wherein, for each split symbol position and each specified payline that includes the respective split symbol position, the processor evaluates whether a symbol from each column of sub-positions contributes to a winning combination, whereby winning combinations can include more symbols than symbol positions.

BRIEF DESCRIPTION OF THE DRAWINGS

FIG. 3 illustrates an example reel strip layout.

DETAILED DESCRIPTION

Embodiments of the present disclosure represent an improvement in the art of electronic gaming machines, systems, and software for such electronic gaming machines or systems. For example, at least some embodiments of the present disclosure employ a display that provides a visual modification of a symbol position arrangements in rows and columns to display more symbols per row or column available to be evaluated. In such embodiments, a symbol position is split into multiple sub-positions, for example, an array of sub-options arranged in rows and columns. A plurality of symbols are randomly selected for display at the plurality of symbol positions and at the multiple sub-positions. The symbols displayed on a payline are evaluated for winnings. As the visual modification shows the player that he/she is expanding to accommodate more symbols than expected, the game display is enhanced for the player.

Further, the visual modification also provides a simplified player experience such that the player may only need to focus on selecting payline, without being overly burdened by complicated calculations. Further, embodiments of the present disclosure also provide certain payout combinations that are not conventional, as those that utilize memory to store symbol data for multiple symbol sets, such that one or more of these multiple sets is used to determine symbols to be selected in various split symbol positions. Thus, embodiments of the present disclosure are not merely new game rules or simply new display patterns, but provide technologic improvements in the art of electronic gaming machines and software for such electronic gaming machines. Moreover, the above example is not intended to be limiting, but merely exemplary of technologic improvements provided by some embodiments of the present disclosure. Technological improvements of other embodiments are readily apparent to those of ordinary skill in the art in light of the present disclosure.

Figure 1:
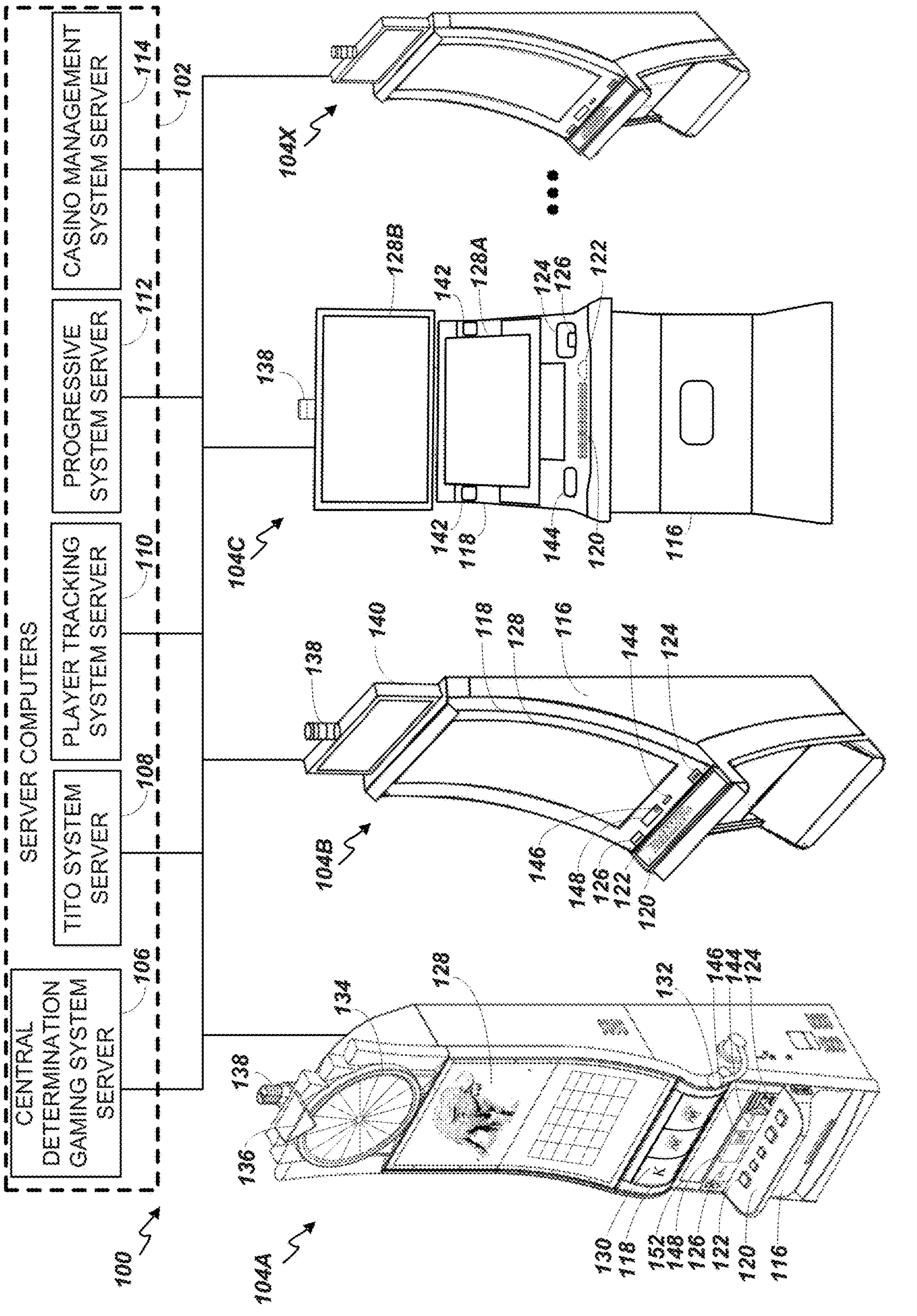
FIG. 1 is an exemplary diagram showing several EGMs networked with various gaming related servers.

FIG. 1 illustrates several different models of EGMs, which may be networked to various gaming related servers. The present disclosure can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a web site maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present disclosure may, in one or more embodiments, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction, which may be aligned in rows or banks of similar devices for placement and operation on a casino floor. The gaming device 104A often includes a main door 116, which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118, which may be used to determine an outcome to the game. In embodiments where the reels are mechanical, mechanisms can be employed to implement greater functionality. For example, the boundaries of the gaming display area boundaries of the gaming display area 118 may be defined by one or more mechanical shutters controllable by a processor. The mechanical shutters may be controlled to open and close, to correspondingly reveal and conceal more or fewer symbol positions from the mechanical reels 130. For example, a top boundary of the gaming display area 118 may be raised by moving a corresponding mechanical shutter upwards to reveal an additional row of symbol positions on stopped mechanical reels. Further, a transparent or translucent display panel may be overlaid on the gaming display area 118 and controlled to override or supplement what is displayed on one or more of the mechanical reel(s).

In many configurations, the gaming machine 104A may have a main display 128 (e.g., video display monitor) mounted to, or above, the gaming display area 118. The main display 128 can be a high-resolution LCD, plasma, LED, or OLED panel, which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. In some embodiments a ticket reader can be used which is only capable of reading tickets. In some embodiments, a different form of token can be used to store a cash value, such as a magnetic stripe card.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking server system 110 to send and receive player-tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a backlit, silkscreened glass panel with lettering to indicate general game information including, for example, a game denomination (e.g., $0.25 or $1), paylines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
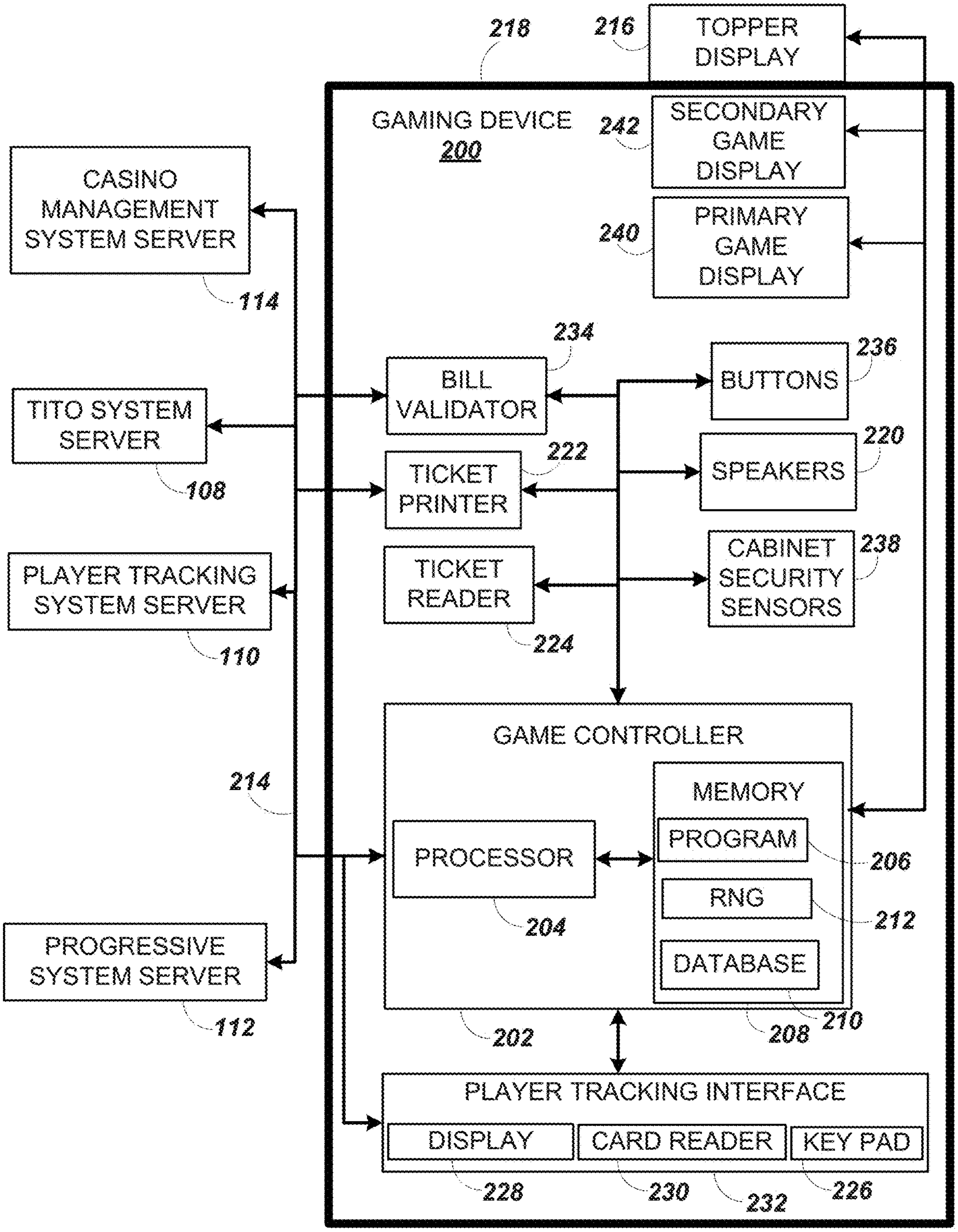
FIG. 2 is a block diagram showing various functional elements of an exemplary EGM.

Many or all the above-described components can be controlled by circuitry (e.g., a gaming controller) housed inside the main cabinet 116 of the gaming device 104A, the details of which are shown in FIG. 2.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 118, which opens to provide access to the interior of the gaming device 104B. The main or service door 118 is typically used by service personnel to refill the ticket-out printer 126, and collect bills and tickets inserted into the bill validator 124. The door 118 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance. In some embodiments, the random number generator 212 is a pseudo-random number generator.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player-tracking interface 232 may include a keypad 226 for entering information, a player tracking display 228 for displaying information (e.g., an illuminated or video display), a card reader 230 for receiving data and/or communicating information to and from media or a device such as a smart phone-enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player-tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general-purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other input device which enables a player to input information into the gaming device 200. In some embodiments, a player's selection may apply across a plurality of game instances. For example, if the player is awarded additional game instances in the form of free games, the player's prior selection of the amount bet per line and the number of lines played may apply to the free games. The selections available to a player will vary depending on the embodiment. For example, in some embodiments a number of paylines may be fixed. In other embodiments, the available selections may include different numbers of ways to win instead of different numbers of paylines.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Figure 4:
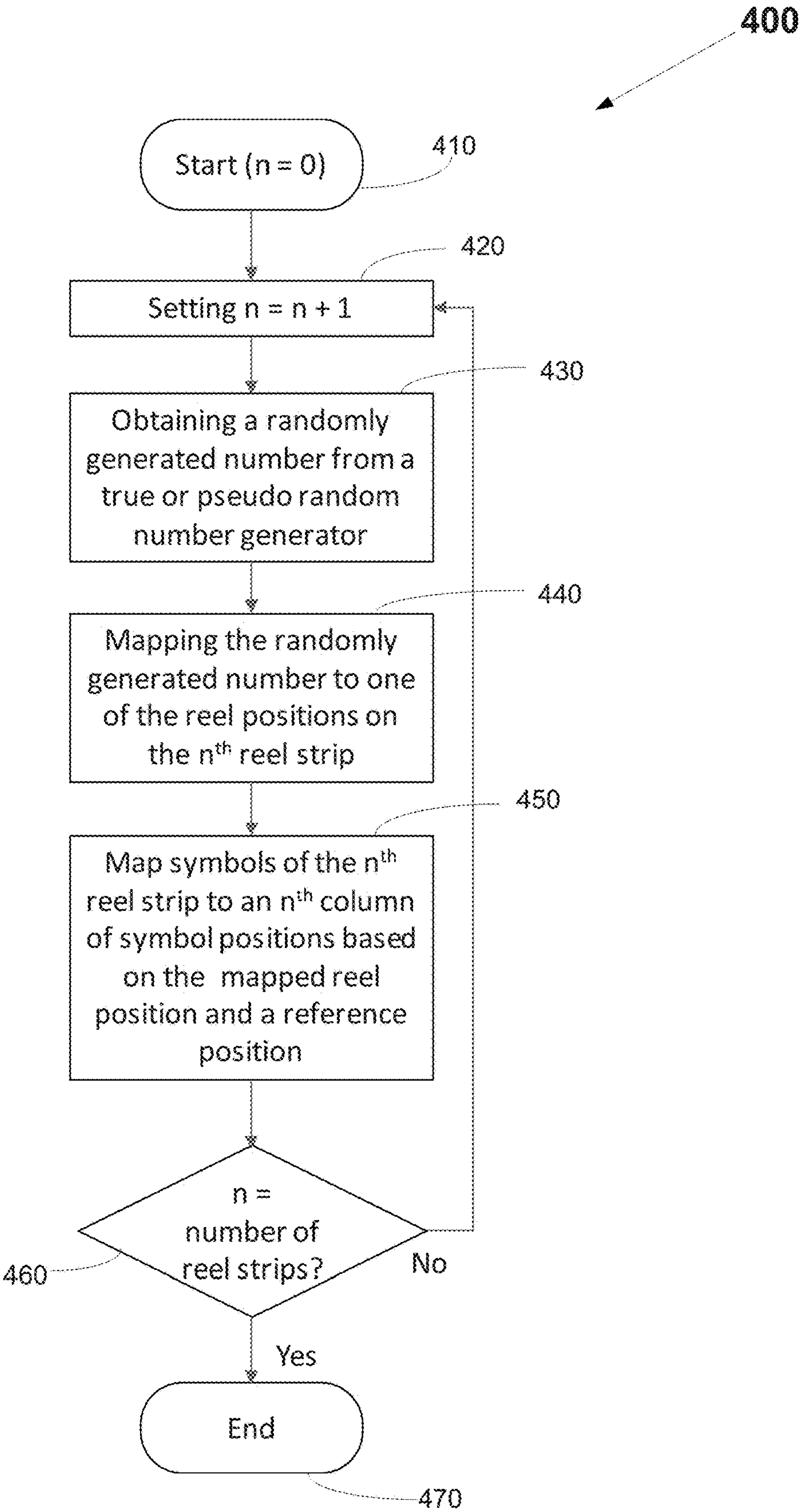
FIG. 4 is a flow chart of a symbol selection method.

FIGS. 3 and 4 illustrate an example of how symbols can be selected for display at symbol positions by the processor of a gaming machine that offers a spinning reel game. FIG. 3 illustrates an example of a set 300 of five reel strips 321, 322, 323, 324, 325. In the example, each reel strip has fifteen reel strip positions 301-315. Each reel strip position of each reel has a symbol For example, a "Wild" symbol 331 occupies the sixth reel strip position 306 of the fourth reel 324. Other reels strips to those illustrated in FIG. 3 can be used, for example, reel strips where two or more wild symbols are placed at consecutive reel strip positions of a reel strip. In other examples, the reel strips could have between 30 and 100 reel strip positions. The actual length of the reel strips would depend on factors such as the number of wild symbols (in general, the more wilds there are, the longer the reel strip needs to be to maintain the target RTP), and volatility (in general, the higher the prize value is, the longer the reel strip needs to be to lower the hit rate to maintain the target RTP).

FIG. 4 is a flow chart of a method 400 carried out by the processor 204 to select symbols from reel strips. At step 410, the processor 204 starts the process of selecting symbols with a counter (n) set at zero as symbols have not yet been selected from any reel strips. At step 420, the processor 204 increments the counter. In the first iteration, the counter is set to 1 to reflect that symbols are to be selected from a first reel strip. At step 430, the processor obtains a randomly generated number from a true or pseudo random number generator 212. At step 440, the processor maps the generated number to one of the reel positions of the $n^{th}$ reel strip. In the first iteration, this is the first reel strip. To map the generated number to one of the reel positions, the possible values that can be returned from the RNG 212 are divided into ranges and associated with specific ones of the reel positions in memory 208. In one example, these ranges are stored as a look-up table. In one example, the ranges are each the same size so that each of the reel strip positions has the same chance of been selected. In other examples, the ranges may be arranged to weight the relative chances of selecting specific reel strip positions. The reel strips may be of different lengths.

At step 450, the processor 204 maps symbols of the nth reel strip to and nth column of symbol positions based on the mapped reel position and a reference position. In an example, the reference position is the bottom position of the symbol positions of each column of symbol positions. In this example, the selected reel position (and hence the symbol at this position) is mapped to the bottom symbol position of the column. In an example, there are two other symbol positions in the column of symbol positions and hence symbols at two neighboring reel strip positions are also mapped to the symbol positions of the column. Referring to the example reel strips of FIG. 3, if the value returned by the RNG 212 is mapped to reel position 313, then for the first reel strip 321, "Pic3" symbol 343 is mapped to a bottom symbol position, "10" symbol 342 is mapped to a middle symbol position, and "J" symbol is mapped to a top symbol position.

At step 460, the processor 204 determines whether symbols have been selected for all of the reel strips, and if not the processor reverts to step 420 and iterates through steps 430, 440 and 450 until it is determined at step 460 that symbols have been selected from all n reel strips and mapped to all n columns of symbol positions after which the symbol selection process ends 470. Different numbers of symbols may be mapped to different numbers of symbol positions.

After the symbols of all reel strips have been mapped to symbol position, the processor 204 controls display 240 to display them at the symbol positions.

Figure 5A:
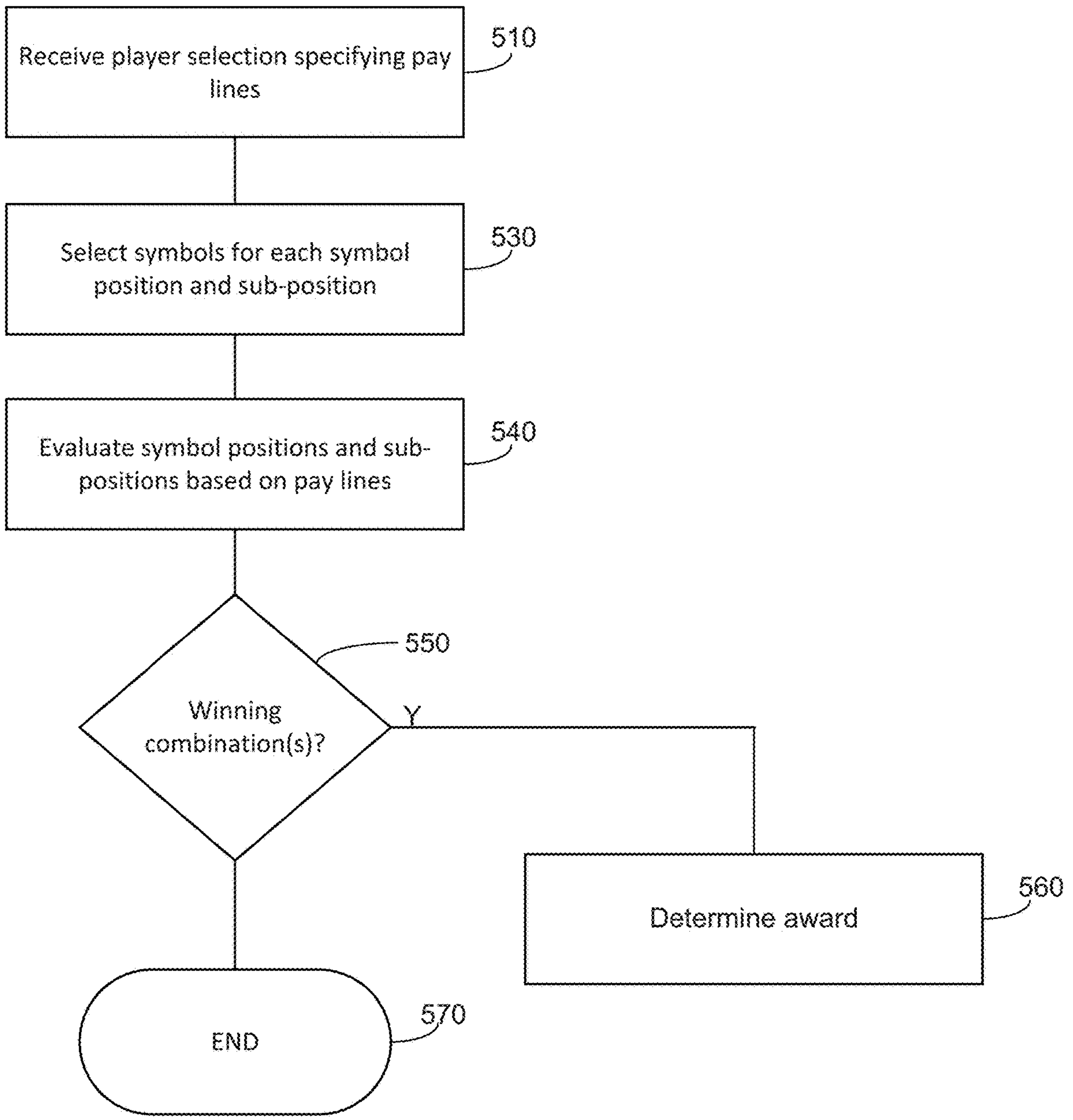
FIGS. 5A and 5B are flow charts of embodiments of the disclosure.
Figure 5B:
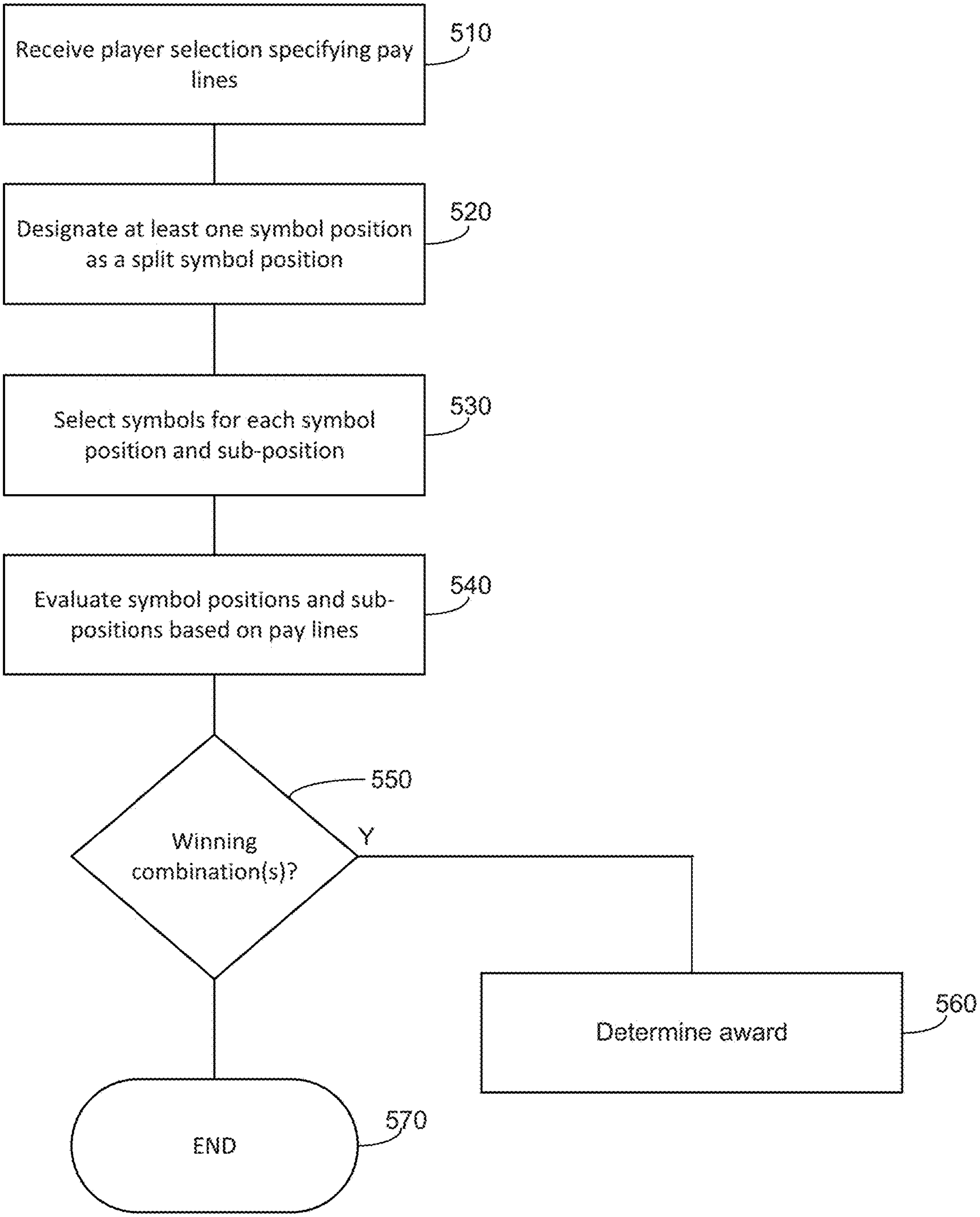

FIGS. 5A and 5B illustrate methods in which a gaming machine operates in order to enable it to incorporate a number of symbol positions that are split into sub-positions from which symbols are selected in order to enable the provision of winning combinations having more symbols than there are symbol position. The embodiment of FIG. 5A employs modified reels, which incorporate "split symbols" and selects symbols using the technique described in relation to FIGS. 3 and 4. The embodiment of FIG. 5B employs a modification of the symbol selection technique described in relation to FIGS. 3 and 4, in order to separately select symbols for both symbol positions and sub-positions. In the embodiments, the processor evaluates the symbols in a manner that enables larger winning combinations.

Figure 6:
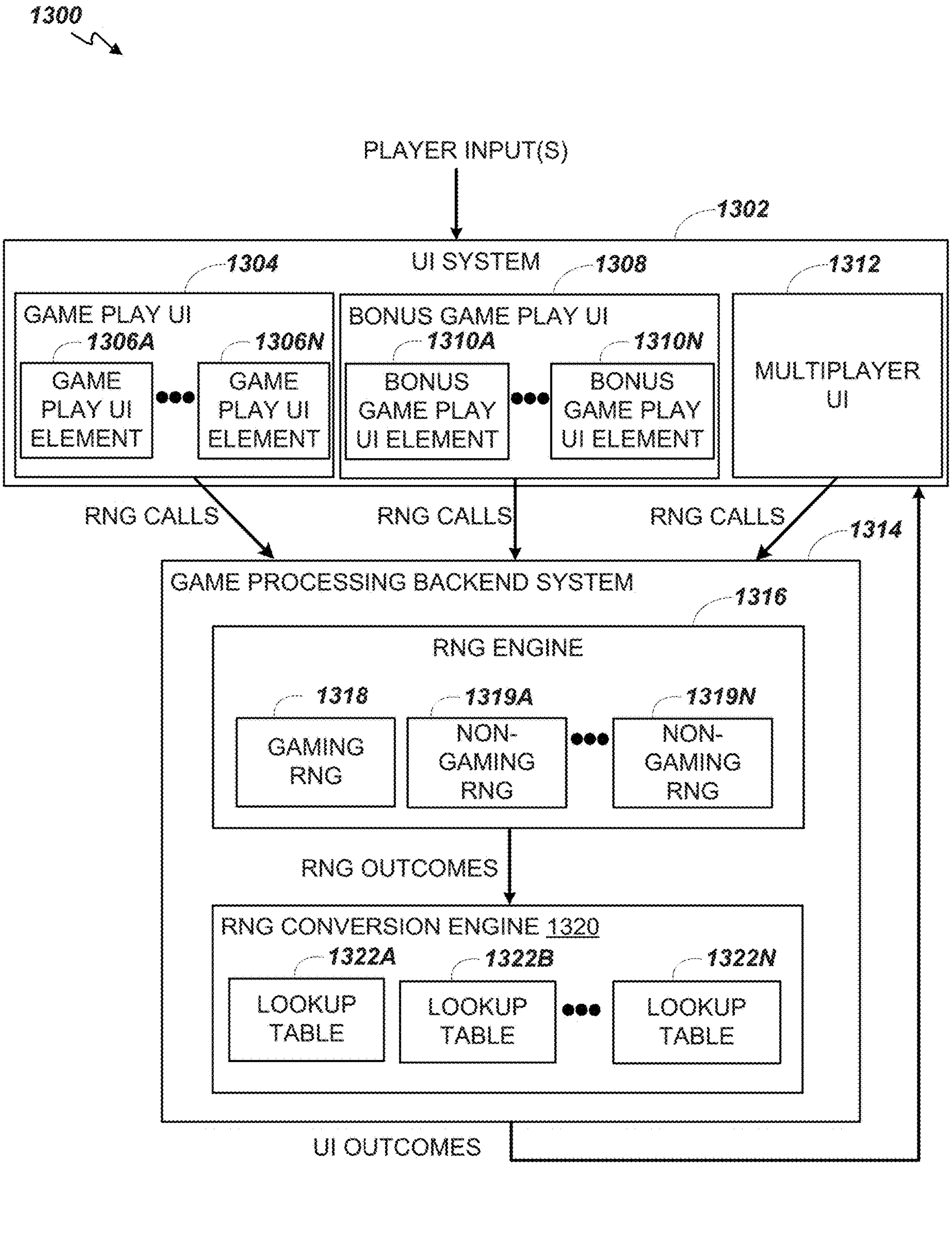
FIG. 6 illustrates, in block diagram form, an embodiment of a game processing architecture that implements a game processing pipeline for the play of a game in accordance with various embodiments described herein.

FIG. 6 illustrates, in block diagram form, an embodiment of a game processing architecture 300 that implements a game processing pipeline for the play of a game in accordance with various embodiments described herein. As shown in FIG. 6, the gaming processing pipeline starts with having a UI system 1302 receive one or more player inputs for the game instance. Based on the player input(s), the UI system 1302 generates and sends one or more RNG calls to a game processing backend system 1314. Game processing backend system 1314 then processes the RNG calls with RNG engine 1316 to generate one or more RNG outcomes. The RNG outcomes are then sent to the RNG conversion engine 1320 to generate one or more game outcomes for the UI system 1302 to display to a player. The game processing architecture 1300 can implement the game processing pipeline using a gaming device, such as gaming devices 104A-104X and 200 shown in FIGS. 1 and 2, respectively. Alternatively, portions of the gaming processing architecture 1300 can implement the game processing pipeline using a gaming device and one or more remote gaming devices, such as central determination gaming system server 106 shown in FIG. 1.

The UI system 1302 includes one or more UIs that a player can interact with. The UI system 1302 could include one or more game play UIs 1304, one or more bonus game play UIs 1304, and one or more multiplayer UIs 1306, where each UI type includes one or more mechanical UIs and/or graphical UIs (GUIs). In other words, game play UI 1304, bonus game play UI 1304, and the multiplayer UI 1304 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 6 as an example, the different UI elements are shown as game play UI elements 1306A-1306N and bonus game play UI elements 1310A-1310N.

The game play UI 1304 represents a UI that a player typically interfaces with for a base game. During a game instance of a base game, the game play UI elements 1306A-1306N (e.g., GUI elements depicting one or more virtual reels) are shown and/or made available to a user. In a subsequent game instance, the UI system 1302 could transition out of the base game to one or more bonus games. The bonus game play UI 1308 represents a UI that utilizes bonus game play UI elements 1310A-1310N for a player to interact with and/or view during a bonus game. In one or more embodiments, at least some of the game play UI element 1306A-1306N are similar to the bonus game play UI elements 1310A-1310N. In other embodiments, the game play UI element 1306A-1306N can differ from to the bonus game play UI elements 1310A-1310N.

FIG. 6 also illustrates that UI system 1302 could include a multiplayer UI 1312 purposed for game play that differ or is separate from the typical base game. For example, multiplayer UI 1302 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 1316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 6 does not explicitly depict that multiplayer UI 1312 includes UI elements, multiplayer UI 1312 could also include one or more multiplayer UI elements.

Based on the player inputs, the UI system 1302 could generate RNG calls to a game processing backend system 1314. As an example, the UI system 1302 could use one or more application programming interfaces (APIs) to generate the RNG calls. To process the RNG calls, the RNG engine 1316 could utilize gaming RNG 1318 and/or non-gaming RNGs 1319A-1319N. Gaming RNG 1318 corresponds to RNG 212 shown in FIG. 2. As previously discussed with reference to FIG. 2, gaming RNG 1318 often performs specialized and non-generic operations that comply with regulatory and/or game requirements. For example, because of regulation requirements, gaming RNG 1318 could be a cryptographic random or pseudorandom number generator (PRNG) (e.g., Fortuna PRNG) that securely produces random numbers for one or more game features. To generate random numbers, gaming RNG 1318 could collect random data from various sources of entropy, such as from an operating system (OS). Alternatively, non-gaming RNGs 1319A-1319N may not be cryptographically secure and/or be computational less expensive. Non-gaming RNGS 1319A-1319N can, thus, be used to generate outcomes for non-gaming purposes. As an example, non-gaming RNGs 1319A-1319N can generate random numbers for such as generating random messages that appear on the gaming device. The RNG conversion engine 1320 processes each RNG outcome from RNG engine 1316 and converts the RNG outcome to a UI outcome that is feedback to the UI system 1302. With reference to FIG. 2, RNG conversion engine 1320 corresponds to RNG conversion engine 210 used for game play. As previously described, RNG conversion engine 1320 translates the RNG outcome from the RNG 212 to a game outcome presented to a player. RNG conversion engine 1320 utilizes one or more lookup tables 1322A-1322N to regulate a prize payout amount for each RNG outcome and how often the gaming device pays out the derived prize payout amounts. In one example, the RNG conversion engine 1320 could utilize one lookup table to map the RNG outcome to a game outcome displayed to a player and a second lookup table as a pay table for determining the prize payout amount for each game outcome. In this example, the mapping between the RNG outcome to the game outcome controls the frequency in hitting certain prize payout amounts. Different lookup tables could be utilized depending on the different game modes, for example, a base game versus a bonus game.

After generating the UI outcome, the game processing backend system 1314 sends the UI outcome to the UI system 1302. Examples of UI outcomes are symbols to display on a video reel or reel stops for a mechanical reel. In one example, if the UI outcome is for a base game, the UI system 1302 updates one or more game play UI elements 1306A-1306N, such as symbols, for the game play UI 1304. In another example, if the UI outcome is for a bonus game, the UI system could update one or more bonus game play UI elements 1310A-1310N (e.g., symbols) for the bonus game play UI 1308. In response to the updating the appropriate UI, the player may subsequently provide additional player inputs to initiate a subsequent game instance that progresses through the game processing pipeline.

Figure 8:
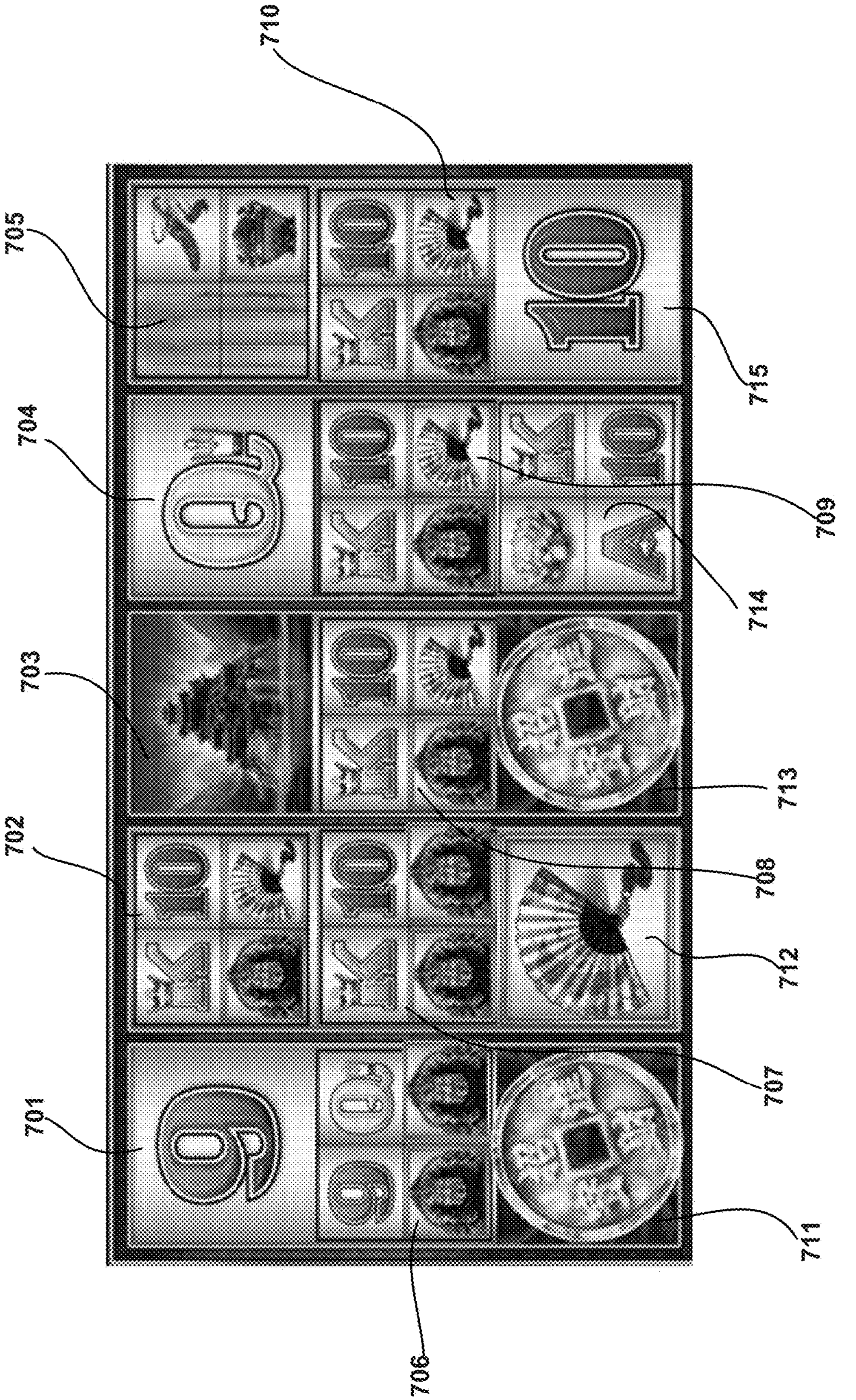
FIG. 8 is an example screen display.

FIG. 8 illustrates an example of a set of symbol positions 700 having a plurality of symbol positions 701-715 of which symbol positions 702, 705, 706, 707, 708, 709, 710, and 714 are split symbol positions each having two columns and two rows of sub-positions. In other embodiments, there may be, for example, two columns of three sub-positions or three columns of three sub-positions.

Referring back to FIG. 5A, in one embodiment, at step 510 the processor 206 receives a player selection that specifies a number of paylines. For example, the player may select from a number of different options that specify different numbers of paylines using buttons 236 (of FIG. 2). In another example, the number of paylines may be fixed and specified by the player selecting an amount to wager.

In the embodiment of FIG. 5A, memory 208 stores reels that have some reel strip positions having a single symbol and some reel strip positions that have multiple symbols arrange in an array of two columns and two rows and the processor 204 selects 530 the symbols for display using the method of FIGS. 3 and 4.

Figure 7:
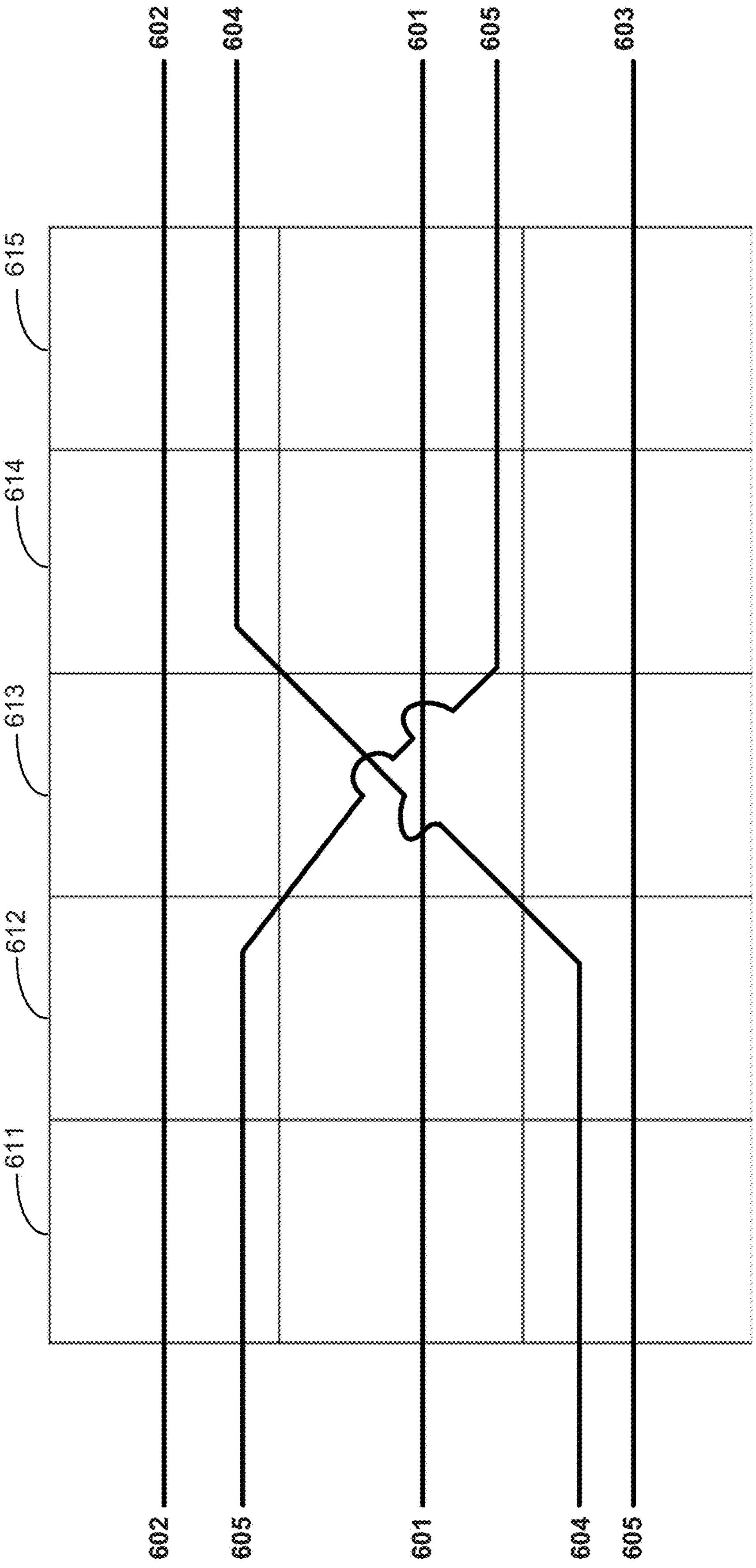
FIG. 7 illustrates an example payline arrangement.

At step 540, the processor evaluates the selected set of symbols based on the specified paylines. FIG. 7 illustrates an example of a set of five paylines 601-605. From FIG. 7, it will be apparent that each payline passes through one symbol position of each column 611-615 to indicate which symbol position of each column will be used in the evaluation of winning combinations for that payline as described in further detail below in relation to the examples. Where a symbol position is split, the processor 204 evaluates whether a symbol from each column of sub-positions contributes to a winning combination. This enables larger winning combinations to be formed, including winning combinations that include more symbols than symbol positions.

The manner in which the processor 204 evaluates symbols can vary from embodiment to embodiment as shown in the examples of FIGS. 10A to 10I. In each of FIGS. 10A to 10I only a line formed from the middle row 911 of symbol positions is evaluated by way of example. In each example, underlined symbols ACE (A) symbols are those that are determined by the processor to form part of a combination. The combinations are then compared to a pay table in memory 208 to determine if they are winning combinations and the prize that applies.

Figure 10A:
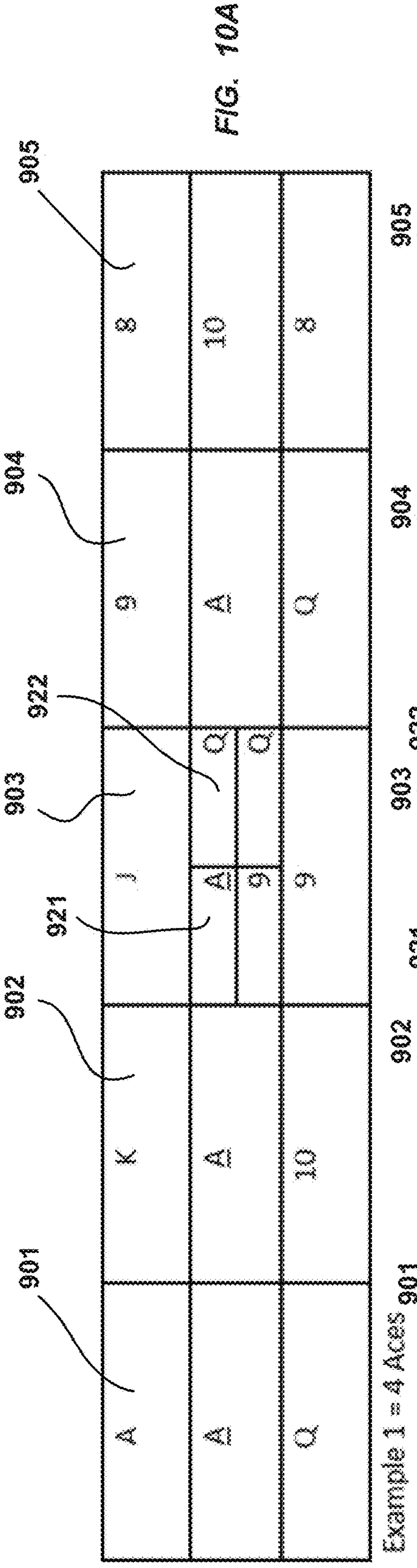
FIGS. 10A to 10I illustrate example symbol evaluations.

Referring to FIG. 10A, there is shown an example, where the processor evaluates sub-positions of split symbol positions on the basis that winning symbol combinations can be formed by symbols being in either one or both of the columns of sub-positions of a split symbol position. In this example, as there is an ACE (A) symbol in the left hand column 921 of sub-positions of the symbol position of the third column 903 as well as symbols in the first, second and fourth columns, the processor 204 evaluates 550 that there are four aces which is a winning combination and hence determines 560 an award from pay table in memory 208 before the game ends 570.

Figure 10B:
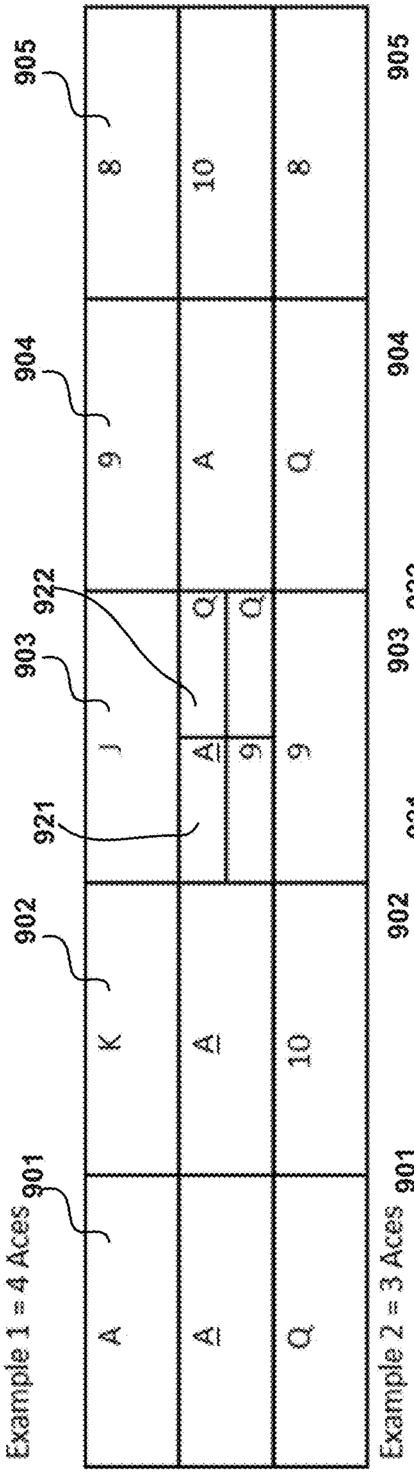

Referring to FIG. 10B, there is shown an alternative example, where the processor evaluates sub-positions of split symbol positions on the basis that winning symbol combinations can only be formed by a symbol of a winning combination being in a column of the sub-positions that is consecutive with another sub-position or a symbol position having the symbol of the winning combination. As there is no Ace in the right hand column 922 of symbol positions, only 3 Aces are in the winning combination.

Figure 10C:
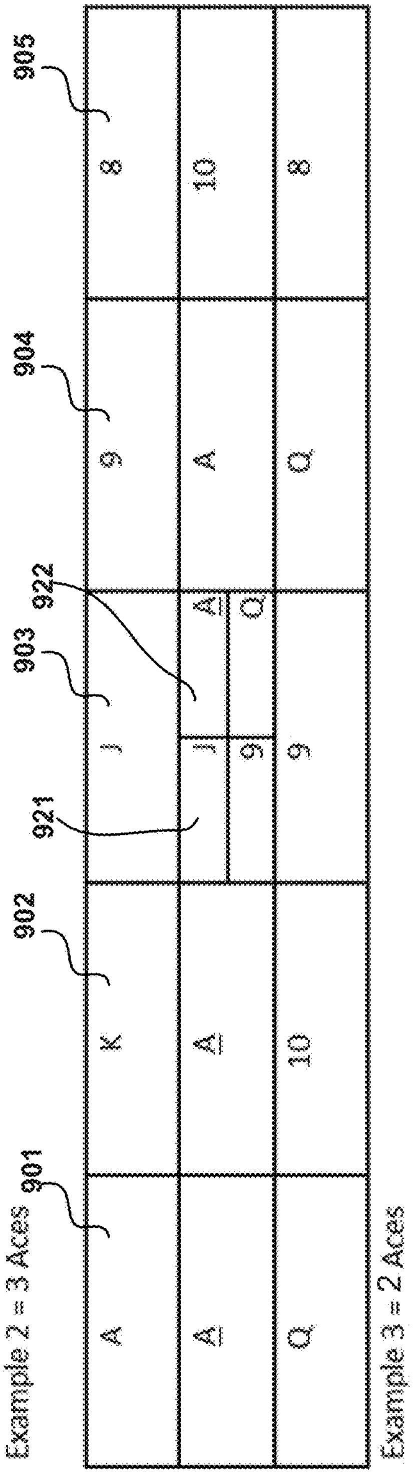

FIG. 10C shows a further example of applying the evaluation of FIG. 10B where an Ace symbol is in the right hand column of sub-positions 922. As a result, there are only two Aces which in this example is insufficient for there to be a winning combination.

Figure 10D:
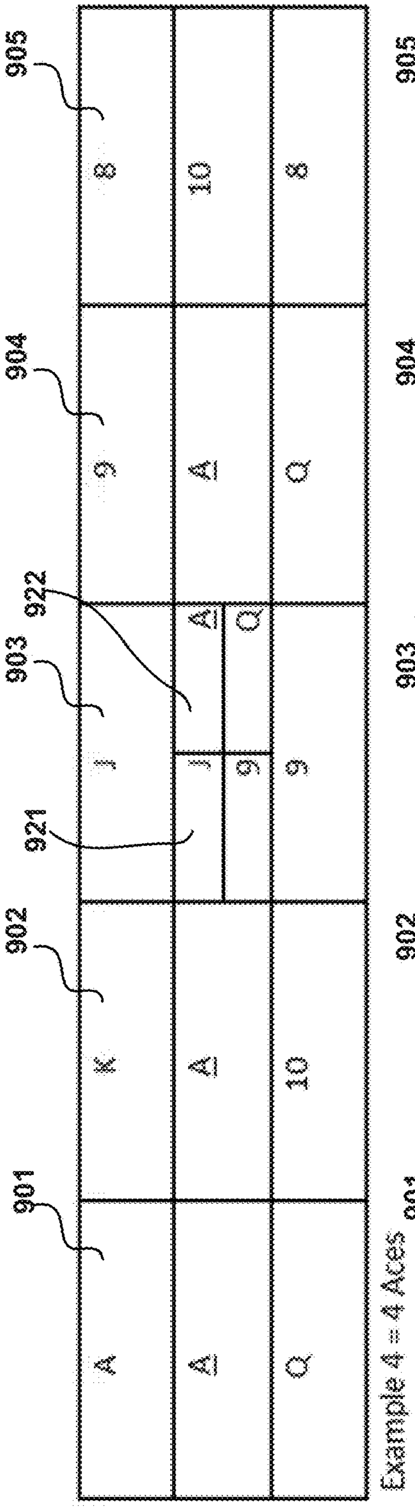

FIG. 10D shows the same arrangement of symbols as FIG. 10C but with the evaluation of FIG. 10A applied resulting in a combination of four ACES.

Figure 10E:
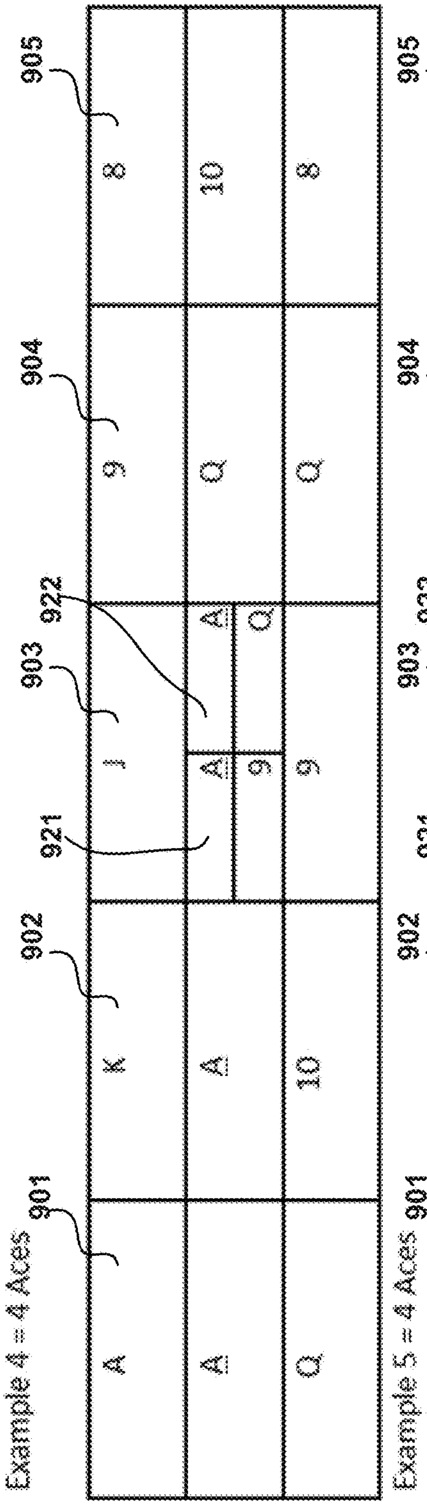

FIG. 10E shows and example, where as there are ACES in both columns 921, 922 of sub-positions, there are combinations of four ACES irrespective of whether the evaluation of FIG. 10A or 10B is applied.

Figure 10F:
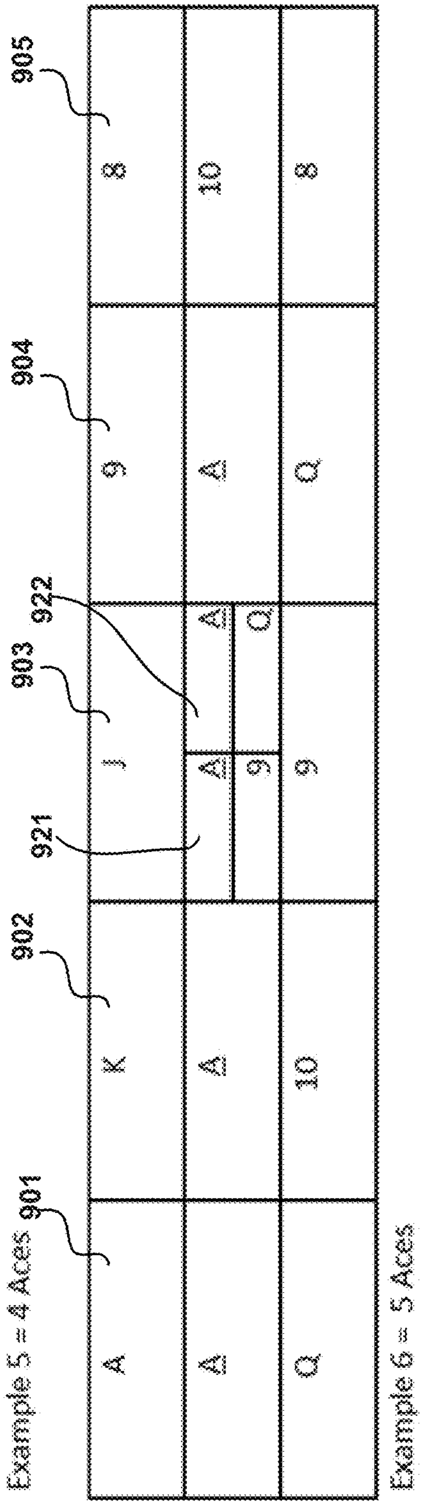

FIG. 10F shows and example, where as there are ACES in both columns 921, 922 of sub-positions, there are combinations of five ACES irrespective of whether the evaluation of FIG. 10A or 10B is applied.

Figure 10G:
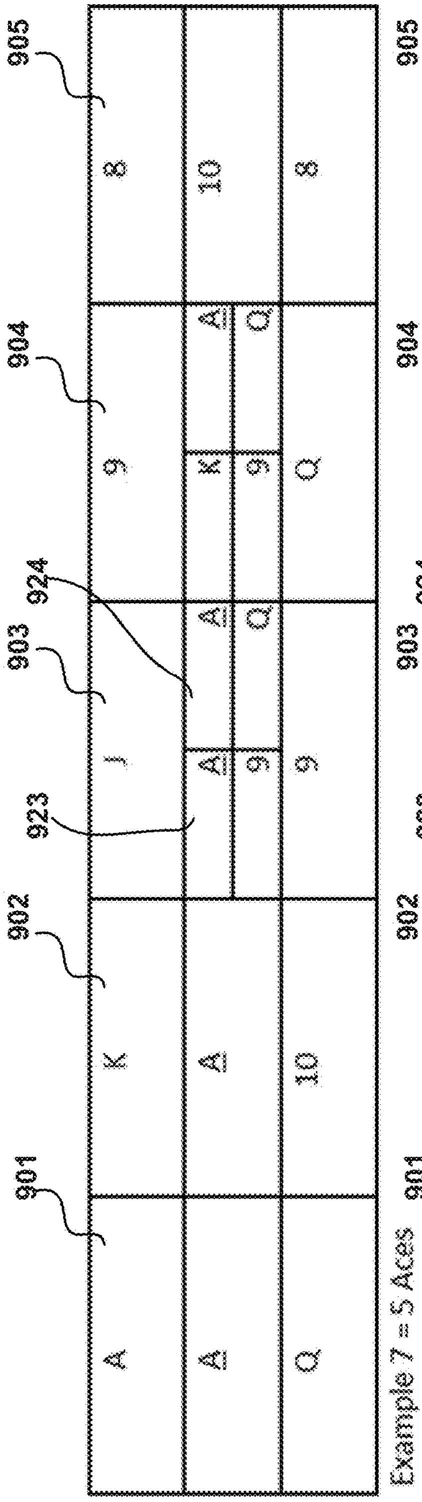

FIG. 10G shows an example, where an Ace is in the right hand column 924 of sub-positions where the evaluation of FIG. 10A is applied with the result of a combination of five ACES.

Figure 10H:
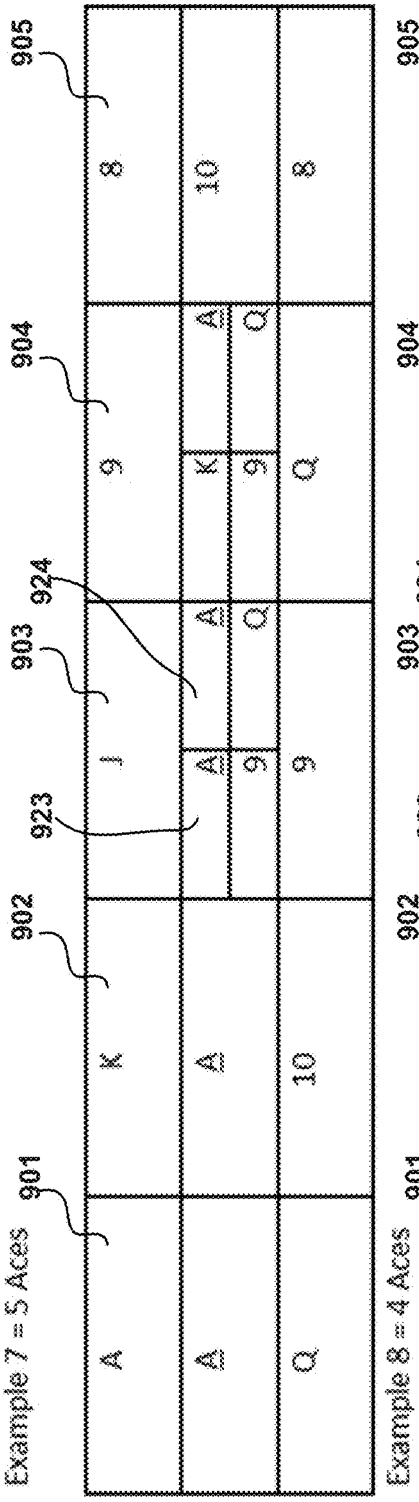

FIG. 10H shows an example, where an Ace is in the right hand column 924 of sub-positions where the evaluation of FIG. 10B is applied with the result of a combination of four ACES.

Figure 10I:
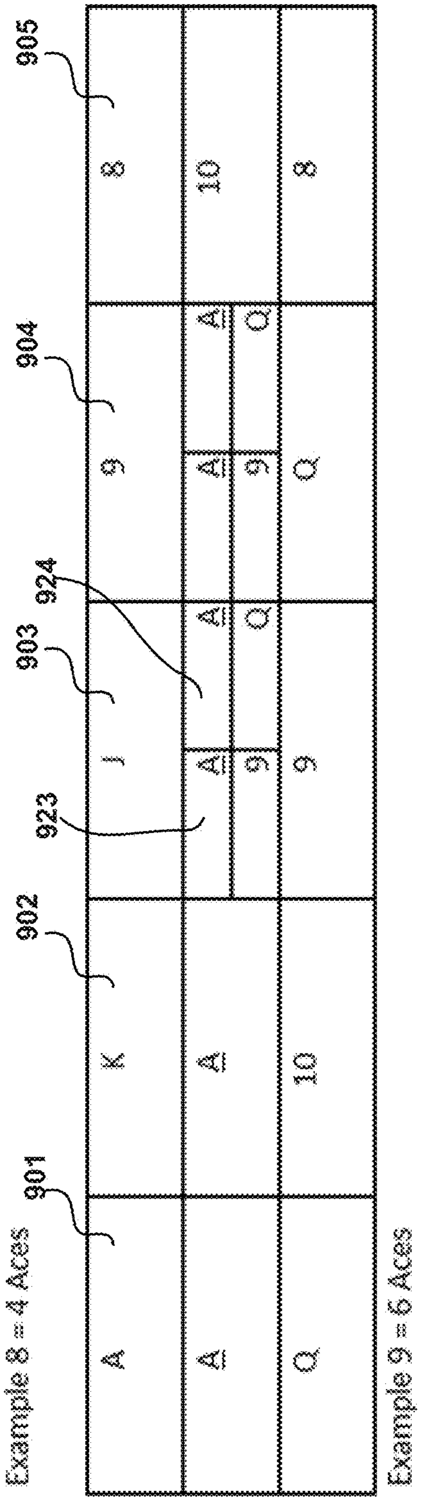

FIG. 10I shows and example, where as there are ACES in both columns 923, 924 of sub-positions of the third and fourth columns 903, 904, there are combinations of five ACES irrespective of whether the evaluation of FIG. 10A or 10B is applied.

From the foregoing examples, it should be apparent that the symbol display of FIG. 8 results in a combination of 5 Eskimos, if the evaluation of FIG. 10A is applied, or 7 Eskimos, if the evaluation of FIG. 10B is applied. Where the evaluation of FIG. 10A is applied, combinations of up to m*N symbols may result, where N represents the number of columns of symbol positions, and m represents the number of columns of symbol sub-positions. For example, the symbol array of FIG. 8, which displays 5 columns of symbol positions and 2 columns symbol sub-positions in the middle row, can result in 10-of-a-kind combinations.

The evaluation to be applied may be selectable by the player. In embodiments, step 510 includes receiving from the player, e.g. via buttons 236, a selected bet amount per line associated with a corresponding evaluation. For example, higher bet amounts are associated with the evaluation of FIG. 10A, whereas lower bet amounts are associated with the evaluation of FIG. 10B.

FIG. 5B shows an alternative embodiment which incorporates and additional step 520 of designating at least one symbol position to be a split symbol position. In one example, the processor 204 uses RNG 212 to select from a weighted table of options that correspond to different combinations of one or more symbol positions being split into sub-positions. Ranges of values that can be returned to by RNG are assigned to the different combinations.

In one example, the processor 204 selects symbols for each symbol position using the technique described above but for each split position the selected symbol is not displayed and is overridden by a separate selection for the sub-positions. An advantage of this embodiment, is that outcomes are less predictable than where the symbols at sub-positions of a reel strip position are fixed. In one example, the processor 204 selects stopping positions of a reel strip corresponding to each column of sub-positions. In one example, the processor uses the same reel strip as applies to the column within which the split position is located for each column of sub-positions. In another example, different reel strips are used for columns of sub-positions. In a further example, individual reel strips can be used for each symbol position or sub-position.

Figure 9:
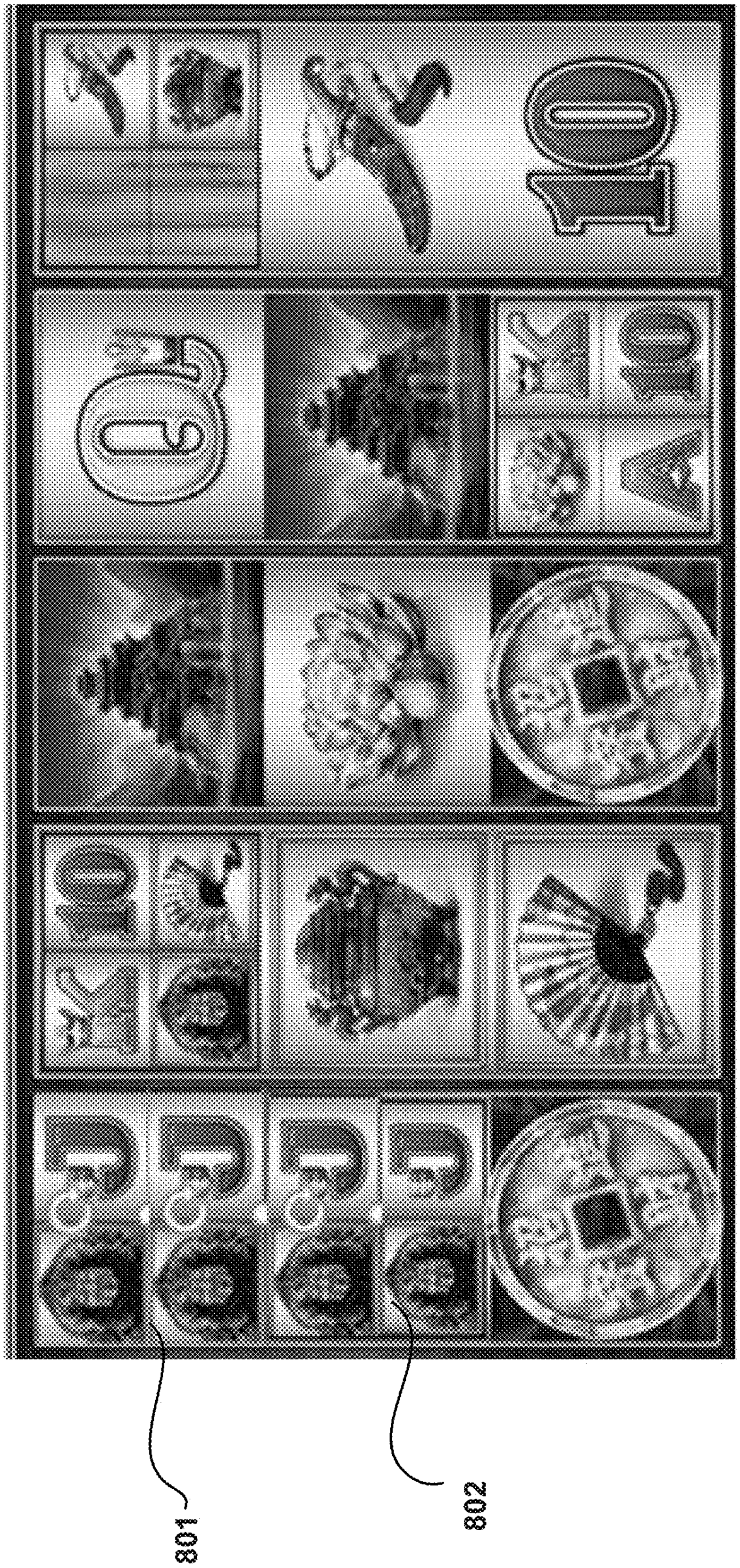
FIG. 9 is a further example screen display.

A number of features employed can be combined with the above embodiments, including: "stacked" symbols as shown at symbol positions 801, 802 of FIG. 9; cash on reels; repeat wins; free games; "sticky" or held wild; etc.

An example embodiment provides a gaming device comprising: a display; a processor; and a memory storing (a) symbol data, (b) a pay table, and (c) instructions which when executed by the processor, cause the processor to: receive a player selection for play of a game, wherein the player selection specifies paylines to be used in an evaluation; select symbols for a set of symbol positions, the set of symbol positions comprising a plurality of columns of symbol positions, wherein each payline is formed from a symbol position of each column, wherein at least one symbol position is split into a set of sub-positions comprising at least two columns of sub-positions, and symbols are selected from the symbol data for each of the sub-positions; display the selected symbols on the display at respective symbol positions and sub-positions; and evaluate the displayed symbols based on the symbol positions on specified paylines and the pay table, wherein, for each split symbol position and each specified payline that includes the respective split symbol position, the processor evaluates whether a symbol from each column of sub-positions contributes to a winning combination, whereby winning combinations can include more symbols than symbol positions.

In an example embodiment, when executed, the instructions cause the processor to evaluate paylines in a defined order of symbol positions.

In an example embodiment, when executed, the instructions cause the processor to evaluate symbol positions of respective paylines from left to right on the basis that symbols of winning symbol combinations must be at consecutive symbol positions.

In an example embodiment, when executed, the instructions cause the processor to evaluate sub-positions of split symbol positions on the basis that winning symbol combinations must be formed from a symbol of a winning combination be in a column of the sub-positions that is consecutive with another sub-position or a symbol position having the symbol of the winning combination.

In an example embodiment, when executed, the instructions cause the processor to evaluate sub-positions of split symbol positions on the basis that winning symbol combinations may be formed by symbols in either one or both of the columns of sub-positions of a split symbol position.

In another example embodiment, a method of operating a gaming device comprising a display, and a memory storing (a) symbol data, and (b) a pay table, the method comprising: receiving a player selection for play of a game, wherein the player selection specifies paylines to be used in an evaluation; selecting symbols for a set of symbol positions, the set of symbol positions comprising a plurality of columns of symbol positions, wherein each payline is formed from a symbol position of each column, wherein at least one symbol position is split into a set of sub-positions comprising at least two columns of sub-positions, and symbols are selected from the symbol data for each of the sub-positions; displaying the selected symbols on the display at respective symbol positions and sub-positions, and evaluating the displayed symbols based on the symbol positions on specified paylines and the pay table, wherein, for each split symbol position and each specified payline that includes the respective split symbol position, the processor evaluates whether a symbol from each column of sub-positions contributes to a winning combination, whereby winning combinations can include more symbols than symbol positions.

In an example embodiment, the method comprises evaluating paylines in a defined order of symbol positions.

In an example embodiment, the method comprises evaluating symbol positions of respective paylines from left to right on the basis that symbols of winning symbol combinations must be at consecutive symbol positions.

In an example embodiment, the method comprises evaluating sub-positions of split symbol positions on the basis that winning symbol combinations must be formed from a symbol of a winning combination be in a column of the sub-positions that is consecutive with another sub-position or a symbol position having the symbol of the winning combination.

In an example embodiment, the method comprises evaluating sub-positions of split symbol positions on the basis that winning symbol combinations may be formed by symbols in either one or both of the columns of sub-positions of a split symbol position.

Another example embodiment provides a gaming system comprising: a display; one or more processors; and at least one memory storing (a) symbol data, (b) a pay table, and (c) instructions which when executed by the one or more processors, cause the one or more processors to: receive a player selection for play of a game, wherein the player selection specifies paylines to be used in an evaluation; select symbols for a set of symbol positions, the set of symbol positions comprising a plurality of columns of symbol positions, wherein each payline is formed from a symbol position of each column, wherein at least one symbol position is split into a set of sub-positions comprising at least two columns of sub-positions, and symbols are selected from the symbol data for each of the sub-positions; display the selected symbols on the display at respective symbol positions and sub-positions; and evaluate the displayed symbols based on the symbol positions on specified paylines and the pay table, wherein, for each split symbol position and each specified payline that includes the respective split symbol position, the processor evaluates whether a symbol from each column of sub-positions contributes to a winning combination, whereby winning combinations can include more symbols than symbol positions.

Another example embodiment provides computer program code which when executed by a processor implements the above method.

Another example embodiment provides a computer readable medium comprising the computer program code.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

The invention claimed is:

1. A gaming system comprising:

a display device providing a plurality of columns of symbol positions, each of the symbol positions having a first position size;

a player interface operable to receive a player-selection and to transmit data indicative of the player-selection;

a game controller comprising a processor, and a memory storing (a) a set of symbol data, (b) a table, and (c) instructions, which, when executed, cause the processor to at least:

receive data indicative of a first selection transmitted from the player interface specifying a first path of symbol positions for an evaluation, the first path of symbol positions specifying a plurality of symbol positions on the plurality of columns of symbol positions, control the display device, to display on the first path of symbol positions, a plurality of symbols randomly selected from the set of symbol data at the plurality of columns of symbol positions, based on one or more random numbers generated in response to the processor processing random data, a first symbol of the plurality of symbols having a first symbol size, override displaying of all symbols selected for the first path of symbol positions responsive to the first path of symbol positions including a first winning combination based on the plurality of columns of symbol positions in the table, receive:

a second selection, from the player interface, the second selection being associated with sub-positions in a respective symbol position that are evaluated as a part of the first path of symbol positions, a selection associated with a first quantity of sub-positions in the first path of symbol positions, each of the first quantity of sub-positions having a second position size, and a selection associated with a second quantity of sub-positions in the first path of symbol positions, each of the second quantity of sub-positions having a third position size, wherein the first quantity of sub-positions is greater than the second quantity of sub-positions, wherein the second position size is greater than the third position size, and the first position size is greater than the second position size and the third position size, and wherein an area occupied by a plurality of second quantity of sub-positions is the same as the area occupied by a symbol position and a plurality of third quantity of sub-positions is the same as the area occupied by the symbol position, split each of the plurality of symbol positions into a plurality of initially non-displayed sub-positions associated with the first path of symbol positions, wherein the processor uses the same reel strip data that applies to the column within which the split symbol position is located for selecting symbols for each column of sub-positions within that split symbol position, thereby reducing computational processing requirements compared to using separate reel strip data for each sub-position, generate, on the display device, a second greater quantity of initially non-displayed sub-positions by generating, on the display device, the plurality of initially non-displayed sub-positions associated with the first path of symbol positions resulting in a second greater quantity of sub-positions each having a lesser position size that is smaller than the first position size, and by generating, on the display device, for the second greater quantity of initially non-displayed sub-positions, a second greater quantity of symbols selected randomly from the set of symbol data in response to the processor processing the random data and the split, wherein each of the second greater quantity of symbols selected has a second size that is smaller than the first symbol size, evaluate the symbol positions and the sub-positions based on the selection of the second greater quantity of symbols and the splitting, control the display device, to display the second greater quantity of initially non-displayed sub-positions to enable a second winning combination that i) is larger than the first winning combination in the table and ii) comprises respective sub-positions selected for the first path of symbol positions based on the second selection, and control the display device, to present an award based on the second winning combination.

2. The gaming system as claimed in claim 1, wherein the instructions, when executed, further cause the processor to evaluate the first path of symbol positions specified in a defined order of the plurality of sub-positions.

3. The gaming system as claimed in claim 1, wherein the instructions, when executed, cause the processor to split a first symbol position into at least two columns of sub-positions.

4. The gaming system as claimed in claim 3, wherein the instructions, when executed, cause the processor to further split the first symbol position into a plurality of rows of sub-positions.

5. The gaming system as claimed in claim 1, wherein the set of symbol data further includes a first set of symbols for each of the plurality of symbol positions, and a second set of symbols for each of the plurality of sub-positions, and wherein the plurality of symbols selected include a first plurality of symbols selected for display from the first set of symbols, and a second plurality of symbols are selected from the second set of symbols.

6. The gaming system as claimed in claim 5, wherein the instructions, when executed, cause the processor to randomly select the first plurality of symbols independent of the second plurality of symbols.

7. The gaming system as claimed in claim 3, wherein the instructions, when executed, cause the processor to randomly select the first symbol position, based on the random data processed by the processor.

8. The gaming system as claimed in claim 7, wherein the instructions, when executed, cause the processor to stack the first symbol position selected on a subsequent round of game.

9. The gaming system as claimed in claim 1, wherein the second winning combination on the first path of symbol positions includes a plurality of winning symbols at each of the plurality of columns of symbol positions and at least one of the plurality of sub-positions per symbol position.

10. The gaming system as claimed in claim 9, wherein each symbol position is split into a plurality of rows of a first sub-position and a second sub-position, and wherein only one of the first sub-position and the second sub-position in a first row of sub-positions display one of the plurality of winning symbols.

11. The gaming system as claimed in claim 9, wherein a first symbol position is split into two columns of sub-positions, and wherein a first column of sub-positions is adjacent the one of the plurality of columns of symbol positions.

12. The gaming system as claimed in claim 1, wherein the set of symbol data further includes a first set of symbols for each of the plurality of symbol positions and for each of the plurality of sub-positions, and wherein the plurality of symbols selected for display include a first plurality of symbols randomly selected from the first set of symbols, and a predetermined second plurality of symbols from the first set of symbols.

13. The gaming system as claimed in claim 1, wherein the instructions, when executed, cause the processor to determine how a first symbol position on the first path of symbol positions is evaluated with respect to the first winning combination.

14. The gaming system as claimed in claim 1, wherein the instructions, when executed, cause the processor to receive an input on how a first symbol position on the first path of symbol positions is evaluated with respect to the first winning combination.

15. A method for expanding a path of symbol positions in a game for use in a gaming system including a display device providing a plurality of columns of symbol positions, each of the symbol positions having a first position size, a player interface operable to receive a player-selection and to transmit data indicative of the player-selection, and a game controller comprising a processor and a memory storing (a) a set of symbol data, (b) a table, and (c) instructions, which, when executed, cause the processor to initiate the game, the method comprising:

transmitting data to the game controller indicative of a first selection from a player interface specifying the first path of symbol positions for evaluation, the first path of symbol positions specifying a plurality of symbol positions on the plurality of columns of symbol positions;

sending data to the display device for display on the first path of symbol positions indicative of a plurality of symbols randomly selected from the set of symbol data at the plurality of columns of symbol positions, based on one or more random numbers generated in response to the processor processing random data, a first symbol of the plurality of symbols having a first symbol size, and to override displaying of all symbols selected for the first path of symbol positions responsive to the first path of symbol positions including a first winning combination based on the plurality of columns of symbol positions in the table;

splitting each of the plurality of symbol positions into a plurality of initially non-displayed sub-positions associated with the first path of symbol positions, wherein the same reel strip data that applies to the column within which the split symbol position is located is used for selecting symbols for each column of sub-positions within that split symbol position, thereby reducing computational processing requirements compared to using separate reel strip data for each sub-position, generating, on the display device, a second greater quantity of initially non-displayed sub-positions by generating, on the display device, for each of the plurality of symbol positions, the plurality of initially non-displayed sub-positions associated with the first path of symbol positions;

transmitting to the game controller, data of a second selection indicative of a bet amount from the player interface, the bet amount being associated with which sub-positions in a respective symbol position are evaluated as a part of the first path of symbol positions, wherein a first bet results in a first quantity of sub-positions are used in the first path of symbol positions, each of the first quantity of sub-positions having a second position size, and a second bet results in a second quantity of sub-positions used in the first path of symbol positions, each of the second quantity of sub-positions having a third position size, wherein the first bet is larger than the second bet, and wherein the first quantity of sub-positions are greater than the second quantity of sub-positions, wherein the second position size is greater than the third position size, and the first position size is greater than the second position size and the third position size, and wherein an area occupied by a plurality of second quantity of sub-positions is the same as the area occupied by a symbol position and a plurality of third quantity of sub-positions is the same as the area occupied by the symbol position;

control the display device, to display responsive to the second greater quantity of initially non-displayed sub-positions having been split from the first path of symbol positions, a second greater quantity of symbols selected randomly from the set of symbol data to enable a second winning combination that i) is larger than the first winning combination in the table, ii) comprises respective sub-positions selected for the first path of symbol positions based on the second selection, and iii) each having a lesser position size that is smaller than the first position size;

evaluating the symbol positions and the sub-positions based on the selection of the second greater quantity of symbols and the splitting; and causing the display device to display an award evaluated based on the second winning combination.

16. A non-transitory computer-readable medium comprising (a) a set of symbol data, (b) a table, and (c) instructions, for conducting a game on a gaming system including a display device providing a plurality of columns of symbol positions, each of the symbol positions having a first position size, a player interface operable to receive a player-selection and to transmit data indicative of the player-selection, and a game controller, the instructions, which, when executed, cause one or more processors to perform the steps of:

receiving data indicative of a first selection transmitted from the player interface specifying a first path of symbol positions for evaluation, the first path of symbol positions specifying a plurality of symbol positions on the plurality of columns of symbol positions;

transmitting to the display device for display on the first path of symbol positions a plurality of symbols randomly selected from the set of symbol data at the plurality of columns of symbol positions, based on one or more random numbers generated in response to the one or more processors processing random data, a first symbol of the plurality of symbols having a first symbol size, and to override displaying of all symbols selected for the first path of symbol positions responsive to the first path of symbol positions including a first winning combination based on the plurality of columns of symbol positions in the table;

splitting each of the plurality of symbol positions into a plurality of initially non-displayed sub-positions associated with the first path of symbol positions, wherein the same reel strip data that applies to the column within which the split symbol position is located is used for selecting symbols for each column of sub-positions within that split symbol position, thereby reducing computational processing requirements compared to using separate reel strip data for each sub-position;

generating, on the display device, a second greater quantity of initially non-displayed sub-positions by generating, on the display device, for each of the plurality of symbol positions, the second greater quantity of initially non-displayed sub-positions associated with the first path of symbol positions on the display device;

transmitting to the game controller, data of a second selection indicative of a bet amount from the player interface, the bet amount being associated with which sub-positions in a respective symbol position are evaluated as a part of the first path of symbol positions, wherein a first bet results in a first quantity of sub-positions are used in the first path of symbol positions, each of the first quantity of sub-positions having a second position size, and a second bet results in a second quantity of sub-positions are used in the first path of symbol positions, each of the second quantity of sub-positions having a third position size, wherein the first bet is larger than the second bet, and wherein the first quantity of sub-positions are greater than the second quantity of sub-positions, wherein the second position size is greater than the third position size, and the first position size is greater than the second position size and the third position size, and wherein an area occupied by a plurality of second quantity of sub-positions is the same as the area occupied by a symbol position and a plurality of third quantity of sub-positions is the same as the area occupied by the symbol position;

controlling the display device, to display, at the second greater quantity of initially non-displayed of sub-positions split from the first path of symbol positions, a second greater quantity of symbols selected randomly from the set of symbol data in response to the one or more processors processing the random data to enable a second winning combination that i) is larger than the first winning combination in the table, ii) comprises respective sub-positions selected for the first path of symbol positions based on the second selection, and iii) each having a lesser position size that is smaller than the first position size;

evaluating the symbol positions and the sub-positions based on the selection of the second greater quantity of symbols and the splitting; and control controlling the display device to display an award evaluated based on the second winning combination.

* * * * *